US010432544B2

(12) United States Patent
Malhotra et al.

(10) Patent No.: US 10,432,544 B2
(45) Date of Patent: Oct. 1, 2019

(54) ENHANCED SEQUENCE NUMBER UPDATING OF ROUTES ASSOCIATED WITH MIGRATING VIRTUAL MACHINES

(71) Applicant: Cisco Technology, Inc., San Jose, CA (US)

(72) Inventors: Neeraj Malhotra, Los Gatos, CA (US); Aparna Pattekar, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 17 days.

(21) Appl. No.: 15/496,158

(22) Filed: Apr. 25, 2017

(65) Prior Publication Data

US 2018/0309691 A1    Oct. 25, 2018

(51) Int. Cl.
*H04L 12/801* (2013.01)
*H04L 12/46* (2006.01)

(52) U.S. Cl.
CPC .......... *H04L 47/34* (2013.01); *H04L 12/4641* (2013.01)

(58) Field of Classification Search
CPC ............................. H04L 47/34; H04L 12/4641
See application file for complete search history.

(56) References Cited

U.S. PATENT DOCUMENTS 7,603,418 B1    10/2009  Xu
8,861,345 B2    10/2014  Hares et al.
9,596,169 B2     3/2017  Choudhury et al.
2012/0201124 A1  8/2012  Marques et al.
2016/0134526 A1  5/2016  Maino et al.
2017/0373973 A1* 12/2017  Bickhart ............. H04L 12/4641

OTHER PUBLICATIONS

Sajassi et al., "Integrated Routing and Bridging in EVPN, draft-ietf-bess-evpn-inter-subnet-forwarding-03," Feb. 8, 2017, 3GPP.*
A. Sajassi, et al., "Integrated Routing and Bridging in EVPN", draft-ietf-bess-evpn-inter-subnet-forwarding-01, L2VPN Workgroup, Internet-Draft, Oct. 18, 2015, 26 pages.
A. Sajassi, Ed. et al., "BGP MPLS-Based Ethernet VPN", Internet Engineering Task Force (IETF), Request for Comments: 7432, Category: Standards Track, ISSN: 2070-1721, Feb. 2015, 56 pages.

* cited by examiner

*Primary Examiner* — Jae Y Lee
(74) *Attorney, Agent, or Firm* — Edell, Shapiro & Finnan, LLC (57) ABSTRACT

Presented herein are techniques that enable Ethernet Virtual Private Networks (EVPNs) to support use cases where either the Layer 2 or Layer 3 route associated with a virtual endpoint is different after the virtual endpoint migrates/moves to a different location. In particular, a networking device running an overlay network detects that a virtual endpoint has migrated on the overlay network from a first computing device to a second computing device. The networking device determines a modified Layer 2/Layer 3 route for the virtual endpoint at the second computing device, as well as a sequence number for association with the modified Layer 2/Layer 3 route. The sequence number is determined based on a sequence number associated with a parent Layer 2 route for the modified Layer 2/Layer 3 route.

20 Claims, 5 Drawing Sheets

ENHANCED SEQUENCE NUMBER UPDATING OF ROUTES ASSOCIATED WITH MIGRATING VIRTUAL MACHINES

TECHNICAL FIELD

The present disclosure relates to updating sequence numbers associated with endpoint routes within a network.

BACKGROUND

A network host, also referred to herein as a "network endpoint" or simply "endpoint," is a physical or virtual device connected to a computer network. An endpoint may offer, for example, informational resources, services, applications, etc. to users or other nodes connected to the network. In general, an endpoint is a node that is assigned a unique Layer 2 (L2) network route, such as Media Access Control (MAC) route, and/or a unique Layer 3 (L3) network route, such as an Internet Protocol (IP) route.

The use of virtual endpoints (e.g., virtual machines and containers) has become increasingly popular with network administrators. In general, virtual endpoints have the ability to migrate/move over time such that memory, storage, processing, network connectivity, etc. of the virtual endpoint are all transferred from one physical server to another physical server. In certain situations, a virtual endpoint may undergo a "live migration" where the virtual endpoint remains up/running during the move from one physical server to another physical server with no impact on availability of the virtual endpoint to users. Alternatively, a virtual endpoint may undergo a "cold migration" where the virtual endpoint is moved from one physical server to another physical server while in a powered-off state.

DESCRIPTION OF EXAMPLE EMBODIMENTS

Overview

Presented herein are techniques that enable Ethernet Virtual Private Networks (EVPNs) to support use cases where either the Layer 2 or Layer 3 route associated with a virtual endpoint is different after the virtual endpoint migrates/moves to a different location. In particular, a networking device running an overlay network detects that a virtual endpoint has migrated on the overlay network from a first computing device to a second computing device. The networking device determines a modified Layer 2/Layer 3 route for the virtual endpoint at the second computing device, as well as a sequence number for association with the modified Layer 2/Layer 3 route. The sequence number is determined based on a sequence number associated with a parent Layer 2 route for the modified Layer 2/Layer 3 route.

DETAILED DESCRIPTION

Figure 1:
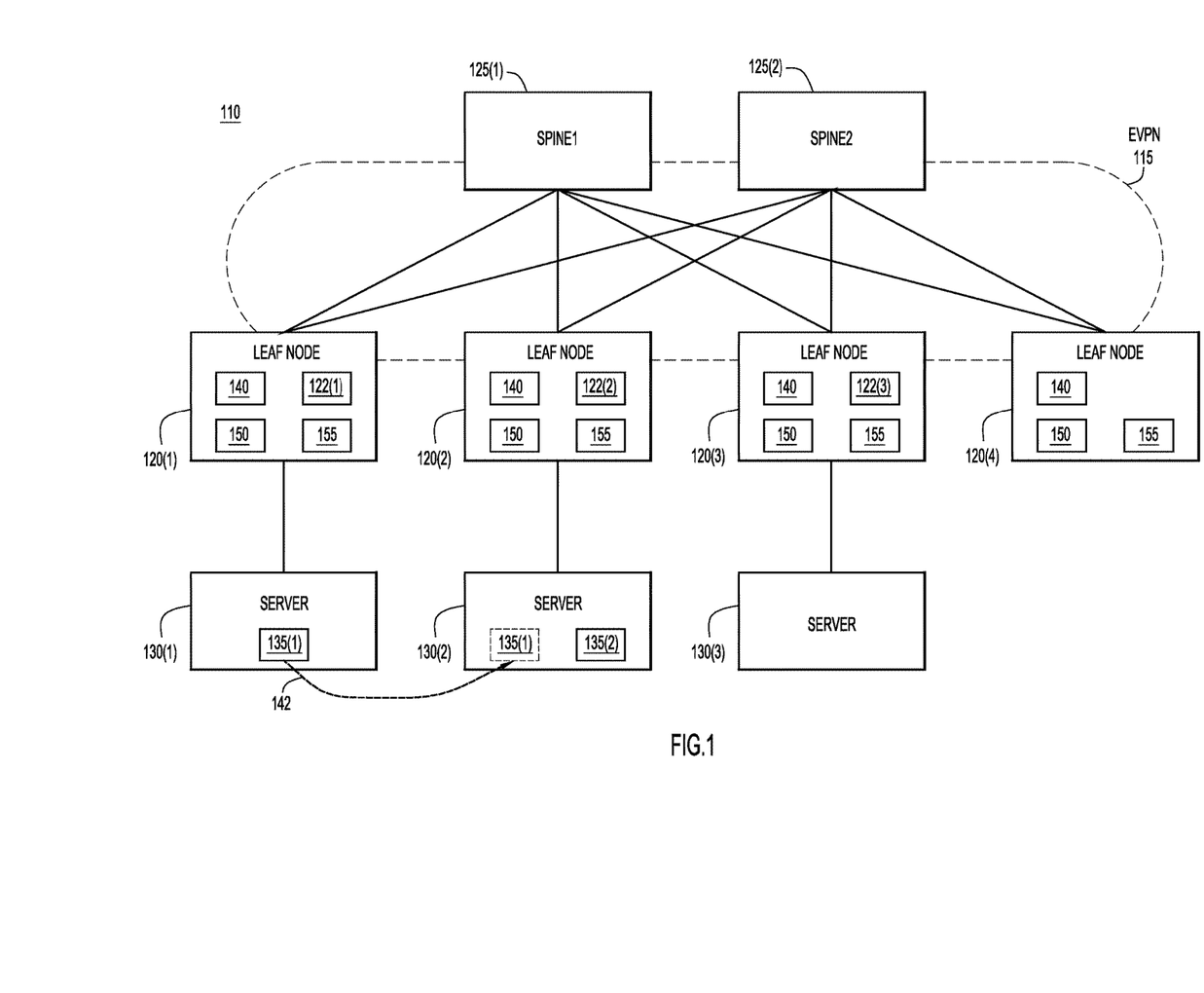
FIG. 1 is a diagram illustrating a network environment configured to implement the sequence number updating techniques, according to an example embodiment.

FIG. 1 is schematic diagram illustrating a network 110 in which sequence number updating techniques in accordance with examples presented herein may be implemented. The network 110 includes a set of interconnected networking devices/nodes (e.g., switches, routers, etc.) in a leaf and spine architecture (e.g., CLOS network topology). More specifically, the network 110 comprises a plurality of leaf nodes (e.g., leaf switches) 120(1)-120(4) and a plurality of spine nodes (e.g., spine switches) 125(1)-125(2). In the example of FIG. 1, the leaf nodes 120(1), 120(2), and 120(3) include sequence number update modules 122(1), 122(2), and 122(3), respectively, configured to implement the sequence number updating techniques presented herein. In the example of FIG. 1, leaf node 120(4) is a border node for the network 110 (i.e., a device that connects the network to an external network, such as the Internet).

In general, a leaf and spine architecture, such as that shown in FIG. 1, creates a low-latency, scalable network fabric. However, it is to be appreciated that the leaf and spine architecture of FIG. 1 is merely an example of a network architecture in which the techniques described herein may be implemented.

In FIG. 1, computing devices 130(1), 130(2), and 130(3) are connected to the leaf switches 120(1), 120(2), and 120(3), respectively. In accordance with examples presented herein, the computing devices 130(1), 130(2), and 130(3) may be physical endpoints themselves (i.e., a physical device configured to offer, for example, informational resources, services, applications, etc. to users or other nodes connected to the network 110) or may be servers that support one or more virtual endpoints, such as virtual machines (VMs), containers, etc. In the specific example of FIG. 1, computing devices 130(1), 130(2), and 130(3) are servers that each host one or more virtual endpoints. For ease of illustration, FIG. 1 only illustrates two virtual endpoints 135(1) and 135(2) initially hosted at servers 130(1) and 130(2), respectively. As such, in the initial arrangement shown in FIG. 1, the virtual endpoints 135(1) and 135(2) each have a "network location" associated with leaf switch 120(1) and leaf switch 120(2), respectively.

The network 110 may include, for example, an Internet Protocol (IP)/Multiprotocol Label Switching (MPLS) core that can support one or more overlay/encapsulated networks 115 that employ any of a variety of endpoint reachability control protocols. For ease of illustration, FIG. 1 and other examples presented herein are primarily described with reference to a specific example endpoint reachability control protocol, namely use of the Ethernet Virtual Private Network (EVPN) route-family as the control plane (i.e., for exchanging the endpoint (network host) MAC/IP routes). In certain examples, the overlay network 115 employs an EVPN-based integrated routing and bridging (IRB) solution and, as such, the overlay network 115 is sometimes referred to herein as an EVPN-IRB overlay network or, more simply, EVPN-IRB network.

In general, EVPN is a networking technology that uses a Layer 2 (L2) extension and interconnection across an IP/MPLS core network to connect different physical sites belonging to a single Layer 2 domain. In certain arrangements, EVPN enables forwarding of both Layer 2 (intra-subnet traffic) and Layer 3 (inter-subnet traffic) traffic while supporting virtual endpoint mobility. An EVPN-IRB solution provides optimum unicast and multicast forwarding for both intra-subnets and inter-subnets within and across data centers. The EVPN network 115 runs across the leaf nodes 120(1)-120(4) and the virtual endpoints 135(1) and 135(2) are reachable via the leaf nodes. That is, the leaf nodes 120(1), 120(2), and 120(3) learn the MAC and IP route of the locally connected virtual endpoints (or other hosts) and this information is advertised via the EVPN control plan to the other leaf nodes.

One feature of EVPN-IRB is the capability to advertise both Layer 2 (e.g., Media Access Control (MAC)) routes/routes and Layer 3 (e.g., Internet Protocol (IP)) routes/routes via a single control plane update/advertisement, sometimes referred to as a combined L2+L3 route-type 2 advertisement or, more simply, as an L2+L3 route update. For ease of illustration, examples are primarily described herein with reference to the use of a MAC route and an IP route associated with a virtual endpoint (i.e., host MAC-IP synchronization). As such, L2+L3 route updates are sometimes referred to herein as MAC+IP route updates. In certain examples, the IP route is advertised along with the MAC route in through the use of the IP field in the EVPN MAC advertisement route. The receiving network devices install the MAC route into the EVPN instance (EVI) table and installs the IP route into the associated virtual routing and forwarding (VRF) table.

As noted above, FIG. 1 illustrates two virtual endpoints 135(1) and 135(2) initially hosted at servers 130(1) and 130(2), respectively. These virtual endpoints 135(1) and 135(2) may migrate/move over time such that memory, storage, processing, network connectivity, etc. of a virtual endpoint are all transferred from one physical server to another physical server. FIG. 1 illustrates an example in which virtual endpoint 135(1) migrates from server 130(1) to 130(2), where the migration is generally represented by arrow 142. After the migration, both virtual endpoints 135(1) and 135(2) are hosted at server 130(2).

Following migration of virtual endpoint 135(1) from server 130(1) to 130(2), leaf node 120(2) discovers virtual endpoint 135(1) at server 130(2) and generates a L2/L3 route update (e.g., a MAC+IP route update) that is propagated to the other leaf nodes 120(1), 120(3), and 120(4). In general, the MAC+IP route update includes, among other information, a MAC route/address for the virtual endpoint 135(1) and an IP route/address for the virtual endpoint 135(1), which collectively form a combined MAC and IP route, sometimes referred to herein as a "MAC+IP route," for the virtual endpoint 135(1). In the MAC+IP route update, the MAC+IP route is also associated with a single sequence number mobility attribute, sometimes referred to herein simply as a "sequence number." The sequence number is to determine an up-to-date path to the corresponding virtual endpoint. In essence, a sequence number acts as a route version timestamp and the highest sequence number associated with a particular route for a virtual endpoint is selected as the most up-to-date path to the virtual endpoint.

Upon migration, the MAC route for the virtual endpoint 135(1) is imported into local bridge MAC tables 145 at the leaf nodes 120(1)-120(4) to enable L2 bridged traffic across the network overlay 115. In an asymmetric IRB design, the IP route for the virtual endpoint 135(1) is imported into the local Route Resolution Protocol (ARP) tables 150 at the leaf nodes 120(1)-120(4), while in a symmetric IRB design the IP route is imported into IP routing tables 155, either of which enables routed traffic across the network overlay. As noted, and in order to support the EVPN mobility procedure, a single sequence number is advertised with the combined MAC+IP route. In conventional arrangements, a single sequence number advertised with the combined MAC+IP route implicitly assumes a one-to-one (1:1) fixed mapping between MAC and IP routes.

While a 1:1 fixed mapping between IP and MAC routes is the common use case, the inventors of the present application have determined that additional IRB use cases, without a 1:1 mapping between IP and MAC routes, need to be supported. These additional use cases include, for example, a so-called "MAC Sharing" use case in which virtual machine IP routes share the same physical server MAC route. In MAC Sharing, when a virtual endpoint moves to a different physical server, the virtual endpoint maintains its IP route, but is associated with the MAC route of the different physical server (i.e., IP route is mapped to a different MAC route). In another use case, a virtual endpoint maintains its MAC route when it moves to a different location, but the MAC route is associated with a different IP route (i.e., MAC route is mapped to a different IP route) following the move.

Mobility in both of the above use cases results in a modified MAC-IP association/mapping for a virtual endpoint. However, as noted above, when a virtual endpoint moves, EVPN uses a combined MAC+IP route update to provide the networking devices with the updated information for the virtual endpoint. Also as noted above, these combined MAC+IP route updates include a single sequence that is assigned independently per each MAC+IP route (i.e., each combination of a MAC route and IP route). Since, in the above use cases one of the MAC route or IP route associated with the virtual endpoint is different after the move, conventional sequence number assignment procedures are insufficient to determine the most recent location for both the MAC route and IP route across the overlay.

Presented herein are sequence number updating techniques, sometimes referred to as enhanced sequence number assignment procedures, that support virtual endpoint mobility for both MAC and IP components in EVPN networks without any assumptions with respect to fixed or 1:1 mapping between IP and MAC routes. In particular, the techniques presented herein ensure that a sequence number advertised with a MAC+IP route is inherited from (i.e., determined based on) only a "parent" Layer 2 (e.g., MAC) route associated with the MAC+IP route. As a result, the techniques presented herein enable EVPN to support use cases, such as the two IRB use cases listed above, where either the IP or MAC route associated with a virtual endpoint is different after the virtual endpoint migrates/moves to a different location. In the example of FIG. 1, the techniques presented herein are enabled by the sequence number update modules 122(1), 122(2), and 122(3), respectively, at the leaf nodes 120(1), 120(2), and 120(3), respectively.

It is to be appreciated that the arrangement shown in FIG. 1 is illustrative and that techniques presented herein may implemented in networks that have different numbers of switches, other networking devices, as well as in networks that have different types of architectures. That is, it is to be appreciated that the leaf and spine architecture of FIG. 1 is merely an example of a network architecture with which the techniques described herein may be implemented. Moreover, it is to be appreciated that the use of an EVPN-IRB overlay network is merely one example, and that the techniques presented herein may be used with other overlay network protocols that advertise Layer 2 (e.g., MAC) and Layer 3 (e.g., IP) routes/routes in a single update/message (i.e., an network protocol in which the L2/L3 routes/routes are bound to one another and updated together).

Figure 2:
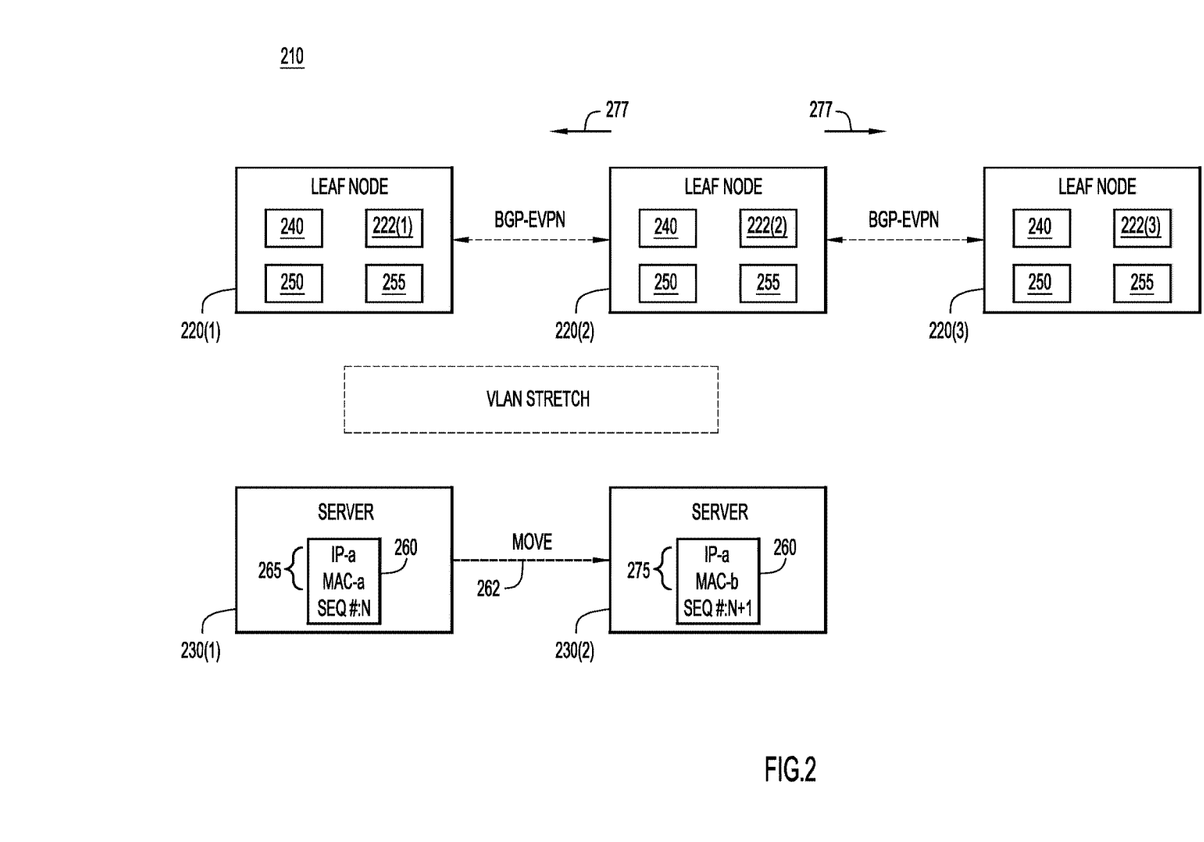
FIG. 2 is a schematic diagram illustrating sequence number updating techniques, according to an example embodiment.
Figure 3:
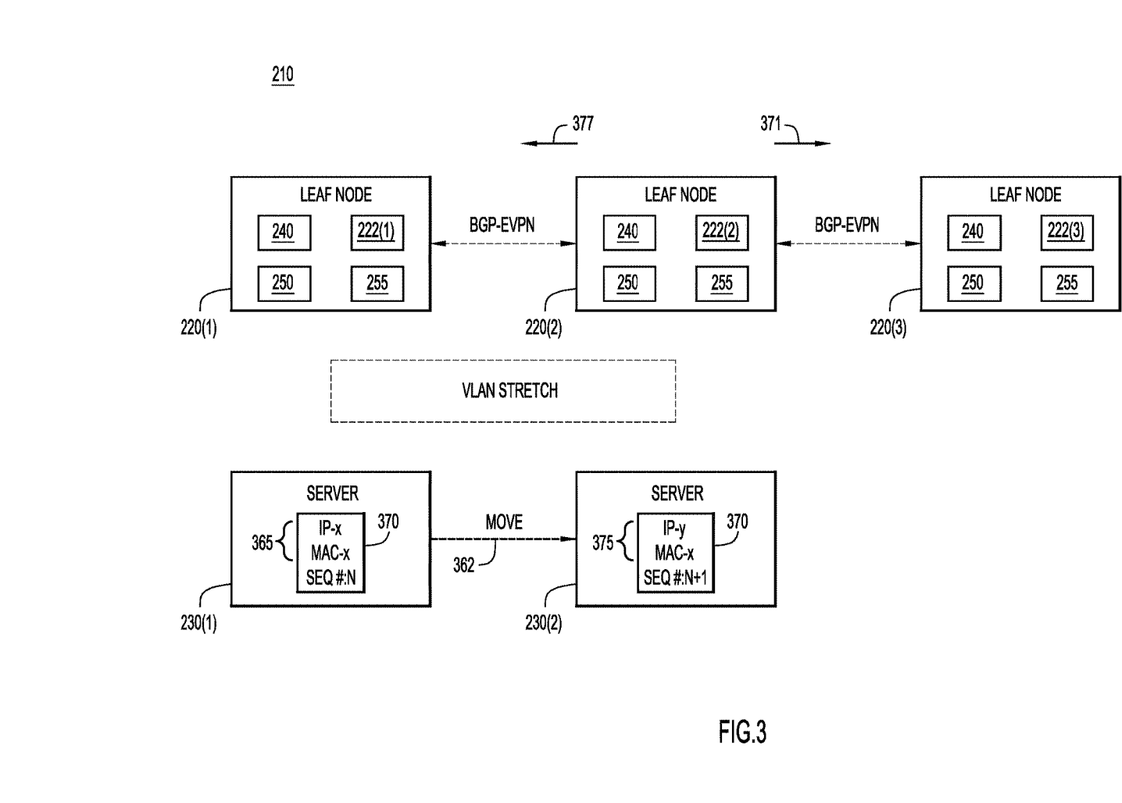
FIG. 3 is a schematic diagram illustrating sequence number updating techniques, according to another example embodiment.

FIGS. 2 and 3 are diagrams illustrating further details of the techniques presented herein in the context of two different types of migrations/moves associated with virtual endpoints. More specifically, FIG. 2 illustrates the techniques presented herein in the context of a virtual endpoint move in which the virtual endpoint maintains its IP route, but receives a different MAC route following the move. FIG. 3 illustrates the techniques presented herein in the context of a virtual endpoint move in which the virtual endpoint maintains its MAC route, but receives a different IP route following the move. It is to be appreciated that the two arrangements and moves shown in FIGS. 2 and 3 are merely illustrative and that the techniques presented herein may be applied in a large variety of different arrangements, with different types of endpoint migrations, etc.

Referring first to FIG. 2, shown is an example in which multiple virtual endpoints on a physical host device (e.g., physical server) share a common MAC route of the physical server. In other words, multiple local MAC-IP ARP entries may be learned with the same MAC route. In such examples, when a virtual endpoint moves to the different physical server, the virtual endpoint retains the same IP route, but is associated with a different MAC route after the move (i.e., the MAC route of the different physical server). As noted, it is to be appreciated that the MAC sharing arrangement of FIG. 2 is one example use case and that the techniques presented herein may be applied in any scenario in which an IP route moves to a different MAC route (e.g., may not necessarily be because of using physical server MAC).

FIG. 2 illustrates a portion of a network 210 that comprises leaf nodes 220(1), 220(2), and 220(3) and servers 230(1) and 230(2), which are connected to leaf nodes 220(1) and 220(2), respectively. Similar to the example of FIG. 1, the leaf nodes 220(1), 220(2), and 220(3) include sequence number update modules 222(1), 222(2), and 222(3), respectively. In addition, each of the leaf nodes 220(1), 220(2), and 220(3) includes a corresponding local bridge MAC table 240, a corresponding local ARP table 250, and/or a corresponding IP routing table 255. For ease of illustration, connections between the leaf nodes 220(1), 220(2), and 220(3) and the servers 230(1) and 230(2), as well as any networking devices interconnecting the leaf nodes 220(1), 220(2), and 220(3) (e.g., spine nodes) have been omitted from FIG. 2. In addition, FIG. 2 illustrates a network that employs Border Gateway Protocol (BGP) with Ethernet Virtual Private Network (EVPN) route-family as the control plane (i.e., for exchanging the MAC+IP routes).

In the example of FIG. 2, a virtual endpoint 260 is initially hosted at server 230(1) and has a MAC route that is schematically shown in FIG. 2 as "MAC-a." While hosted at server 230(1), virtual endpoint 260 also has an IP route, which is schematically shown in FIG. 2 as "IP-a." Collectively, the MAC route (MAC-a) and the IP route (IP-a) for the virtual endpoint 260 at server 230(1) form a combined IP and MAC route (MAC+IP route) 265 for the virtual endpoint 260.

The MAC+IP route 265 is associated with a sequence number, which has a value of "N." In an EVPN network, such as that shown in FIG. 2, the sequence number is used to determine an up-to-date path to the corresponding virtual endpoint. In essence, a sequence number acts as a route version timestamp and the highest sequence number associated with a particular route for a virtual endpoint is selected as the most up-to-date path to the virtual endpoint.

As noted, virtual endpoint 260 is initially hosted at server 230(1). However, at a subsequent time, virtual endpoint 260 migrates/moves from server 230(1) to server 230(2). This migration is generally represented in FIG. 2 by arrow 262. Following migration of virtual endpoint 260 from server 230(1) to 230(2), leaf node 220(2) discovers virtual endpoint 260 at server 230(2) and generates a MAC+IP route update that is propagated to the other leaf nodes 220(1), and 220(3). In general, the MAC+IP route update includes, among other information, a MAC route for the virtual endpoint 260, an IP route for the virtual endpoint 260, and a different single sequence number. As shown in MAC+IP FIG. 2, when the virtual endpoint 260 moves to server 230(2), it is assigned a different MAC route, schematically shown in FIG. 2 as "MAC-b," while retaining the same IP route (IP-a). Collectively, the new MAC route (MAC-b) and the IP route (IP-a) for the virtual endpoint 260 at server 230(4) form a modified combined IP and MAC route (modified MAC+IP route) 275 for the virtual endpoint 260.

As noted above, the use of a single sequence number advertised with the combined MAC+IP route in conventional EVPN networks implicitly assumes a one-to-one (1:1) fixed mapping between IP and MAC routes/addresses. However, as noted above, when the virtual endpoint 260 moves to server 230(2), it is assigned a different MAC route (MAC-b) while retaining the same IP route (IP-a). As a result, the move shown in FIG. 2 creates the "modified" MAC+IP route 275, thereby breaking the fixed 1:1 mapping that is relied upon in convention EVPN networks. As used herein, a "modified" MAC+IP route is a combined L2/L3 route in which only one of either the L2 route or the L3 route associated with a virtual endpoint changes as a result of migration of the virtual endpoint between different network locations (e.g., a different IP route to MAC route mapping, where only one of the IP route or the MAC route changes due to the virtual endpoint migration).

Also as noted above, conventional EVPN networks associate sequence numbers with both the IP route and the MAC route (i.e., the combined MAC+IP route) of a virtual endpoint. In these conventional EVPN networks, if either of the MAC route or the IP route changes (i.e., if the fixed 1:1 mapping is broken), the sequence number may not adequately reflect the most up-to-date route information for a virtual endpoint. Specifically, if a fresh sequence number is assigned by treating this MAC+IP as a new route, the sequence number mobility attribute can no longer be used to determine most recent host IP reachability in a symmetric EVPN-IRB design or the most recent IP to MAC binding in an asymmetric EVPN-IRB design.

To route the above problems, the sequence number update techniques presented herein utilize a sequence number determination/assignment procedure that is able to define the sequence number for combined MAC+IP routes in a manner that allows the networking devices to unambiguously determine the most recent IP reachability, IP to MAC binding, and MAC reachability for such a MAC sharing scenario when, following a move, the MAC route of the virtual endpoint 260 changes, but the IP route of the virtual endpoint 260 stays the same. More specifically, the sequence number update techniques presented herein define a modified MAC+IP route, such as modified MAC+IP route 275, as a "child" route of only a corresponding MAC route associated with the modified MAC+IP route. As described further below, the modified MAC+IP route 275 then inherits the sequence number from only a "parent" MAC route associated with the modified MAC+IP route. In the example of FIG. 2, the "parent" MAC route is the MAC route that already exists in the network and which is associated with the IP route in the modified MAC+IP route 275. This is shown in the example of FIG. 2 where, at server 230(1), the MAC+IP route 275 for virtual endpoint 260 at server 230(1) has a sequence number of "N," which is selected based on the already existing MAC route (MAC-a), which was previously associated with the IP route (IP-a). When the virtual endpoint 260 moves to server 230(2), the sequence number for the modified MAC+IP route 275 for virtual endpoint 260 at server 230(2) is inherited from the previously MAC route (i.e., the MAC route at server 230(1)). Therefore, after the move, the sequence number for the modified MAC+IP route virtual endpoint 260 is "N+1." That is, the new MAC route is assigned a sequence number incremented from the old MAC route previously associated with the IP route, which is then inherited by the new MAC+IP route.

The example of FIG. 2, since the MAC route MAC-b is different, there are no previous routes associated with that MAC route. As such, any sequence number associated with the MAC route MAC-b would enable the leaf nodes 220(1)-220(3) to identify the correct MAC route for virtual endpoint 260 and, accordingly, update the MAC (L2) reachability information for the virtual endpoint 260. However, since the IP route (IP-a) was already in use in the network, and has a sequence number of N associated therewith (as part of the MAC+IP route 265), to enable the networking devices to identify the different IP route for virtual endpoint 260 and, accordingly, update the IP (L3) reachability information for the virtual endpoint 260, any sequence number for the IP route must be higher than the previous MAC-IP route sequence number advertised from the prior location (i.e., higher than N). Since, as noted above, the modified MAC+IP route 275, which includes both the IP route (IP-a) and the MAC route (MAC-b), is assigned a sequence number of N+1, the networking devices (e.g., leaf nodes 220(1), 220(2), and 220(3) and other devices that are part of the overlay) can clearly determine and program the most recent MAC binding and reachability for the IP.

In the example of FIG. 2, following determination of the modified MAC+IP route 275 and the associated sequence number, the modified MAC+IP route 275 and the associated sequence number are advertised the other networking devices running the overlay network (e.g., leaf nodes 220(1)-220(3)). In one form, a single control plane update/advertisement, sometimes referred to as a combined L2+L3 route-type 2 advertisement or, more simply, as an L2+L3 route update, is used to advertise/distribute the MAC+IP route 275 and the associated sequence number. In FIG. 2, arrows 277 generally illustrate an example L2+L3 route update that is generated and sent by the leaf node 220(2).

As noted, FIG. 2 generally illustrates the movement of a virtual endpoint where the MAC route portion of a MAC+IP route associated with the virtual endpoint changes. FIG. 3 illustrates another example in which the IP route portion of a MAC+IP route associated with the virtual machine, rather than the MAC route portion, changes following a migration of the virtual endpoint. For ease of description, FIG. 3 is described with reference to the same network arrangement of FIG. 2 (i.e., a portion of the network 210 that comprises leaf nodes 220(1), 220(2), and 220(3) and servers 230(1) and 230(2)).

In the example of FIG. 3, a virtual endpoint 370 is initially hosted at server 230(1) and the virtual endpoint 370 has a MAC route that is schematically shown as "MAC-x." While hosted at server 230(1), virtual endpoint 370 also has an IP route, which is schematically shown in FIG. 3 as "IP-x." Collectively, the MAC route (MAC-x) and the IP route (IP-x) for the virtual endpoint 370 at server 230(1) form a combined IP and MAC route (MAC+IP route) 365 for the virtual endpoint 370. The MAC+IP route 365 is associated with a sequence number, which has a value of "N." As noted above, in an EVPN network, such as that shown in FIG. 3, the sequence number is used to determine an up-to-date path to the corresponding virtual endpoint.

As noted, virtual endpoint 370 is initially hosted at server 230(1). However, at a subsequent time, virtual endpoint 370 migrates/moves from server 230(1) to server 230(2). This migration is generally represented in FIG. 3 by arrow 362. Following migration of virtual endpoint 370 from server 230(1) to 230(2), leaf node 220(2) discovers virtual endpoint 370 at server 230(2) and generates a MAC+IP route update that is propagated to the other leaf nodes 220(1), and 320(3). In general, the MAC+IP route update includes, among other information, a MAC route for the virtual endpoint 370, an IP route for the virtual endpoint 370, and a different single sequence number. As shown in FIG. 3, when the virtual endpoint 370 moves to server 230(2), it is assigned a different IP address, while retaining the same MAC route (MAC-x) that is advertised from a new location. The IP route from the leaf, which is generated from the different IP address, is schematically shown in FIG. 3 as "IP-y." Collectively, the MAC route (MAC-x) and the IP route (IP-y) for the virtual endpoint 370 at server 230(4) form a modified combined IP and MAC route (modified MAC+IP route) 375 for the virtual endpoint 370.

As noted above, the use of a single sequence number advertised with the combined MAC+IP route in conventional EVPN networks implicitly assumes a one-to-one (1:1) fixed mapping between IP and MAC routes. However, as noted above, when the virtual endpoint 370 moves to server 230(2) (e.g., virtual endpoint MAC route moves to, or is re-provisioned at, a different IRB gateway), the virtual machine MAC route (MAC-x) is retained and associated with a different IP route (IP-y). That is, the MAC route (MAC-x) is advertised from a new location. As a result, the move shown in FIG. 3 creates the modified MAC+IP route (i.e., a different IP route to MAC route mapping) 375, thereby breaking the fixed 1:1 mapping that is relied upon in convention EVPN networks and creates a different IP association for the host MAC.

Also as noted above, conventional EVPN networks associate sequence numbers with both the IP route and the MAC route (i.e., the combined MAC+IP route) of a virtual endpoint. In these conventional EVPN networks, if either of the MAC route or the IP route changes (i.e., if the fixed 1:1 mapping is broken), the sequence number may not adequately reflect the most up-to-date route information for a virtual endpoint (e.g., a fresh sequence number cannot be used to determine the most recent MAC reachability). Complicating this scenario is that, since the MAC reachability is carried via the combined MAC+IP, a MAC only route may not be advertised at all.

To address the above problems, the sequence number update techniques presented herein define a modified MAC+IP route, such as modified MAC+IP route 375, as a "child" route of only a corresponding MAC route associated with the modified MAC+IP route. The modified MAC+IP route 375 then inherits the sequence number from only the "parent" MAC route associated with the modified MAC+IP route. In the example of FIG. 3, the "parent" MAC route is the MAC route in the modified MAC+IP route 375, which already exists in the network as a remote MAC route (i.e., as a MAC route in the MAC+IP route 365). This is shown in the example of FIG. 3 where, at server 230(1), the MAC+IP route 375 for virtual endpoint 370 at server 230(1) has a sequence number of "N," which is selected based on the MAC route (MAC-x) within the modified MAC+IP route 375. When the virtual endpoint 370 moves to server 230(2), the sequence number for the modified MAC+IP route 375 for virtual endpoint 370 at server 230(2) is inherited from the previous MAC route (i.e., the MAC route at server 230(1)). Therefore, after the move, the sequence number for the modified MAC+IP route of virtual endpoint 370 is "N+1."

The example of FIG. 3, since the IP route (IP-y) is different after the migration, there are no previous routes associated with that IP route. As such, any sequence number associated with the IP route (IP-y) would enable the leaf nodes 220(1)-220(3) to identify the different IP route for virtual endpoint 370 and, accordingly, update the IP (L3) reachability information for the virtual endpoint 370. However, since the MAC route (MAC-x) was already in use in the network, and has a sequence number of N associated therewith (as part of the MAC+IP route 365), to enable the networking devices to identify the MAC route advertised from the new location for virtual endpoint 370 and, accordingly, update the MAC (L2) reachability information for the virtual endpoint 370, any sequence number for the IP route must be higher than the previous MAC-IP route sequence number advertised from the prior location (i.e., higher than N). Since, as noted above, the MAC+IP route 375, which includes both the IP route (IP-y) and the MAC route (MAC-x) for virtual endpoint 370 at server 230(2), is assigned a sequence number of N+1, the networking devices (e.g., leaf nodes 220(1), 220(2), and 220(3) and other devices that are part of the overlay) can clearly determine and program the most recent MAC binding and reachability information for the MAC route. In other words, a MAC move to new location results in a MAC sequence number update to N+1 which is inherited by the modified MAC+IP route 375 (IP-y, MAC-x).

In the example of FIG. 3, following determination of the modified MAC+IP route 375 and the associated sequence number, the modified MAC+IP route 375 and the associated sequence number are advertised the other networking devices running the overlay network (e.g., leaf nodes 220 (1)-220(3)). In one form, a single control plane update/advertisement, sometimes referred to as a combined L2+L3 route-type 2 advertisement or, more simply, as an L2+L3 route update, is used to advertise/distribute the MAC+IP route 375 and the associated sequence number. In FIG. 3, arrows 377 generally illustrate an example L2+L3 route update that is generated and sent by the leaf node 220(2).

In the example of FIG. 3, the sequence number associated with a local MAC and all local MAC+IP children also be incremented to N+1 and updated across the overlay. However, this avoids the need for separate sequence number attributes to be maintained for IP and MAC. Implementations would generally to be able to lookup MAC+IP routes for a given IP and update sequence number for the associated parent MAC and its MAC+IP children.

Collectively, FIGS. 2 and 3 illustrate two example scenarios in which the MAC route to IP route binding/association of a virtual endpoint changes after a migration of the virtual endpoint (i.e., either the IP route or the MAC route changes). To ensure both proper IP and MAC route updating, the techniques presented herein are configured to ensure that the sequence number associated with the modified MAC+IP route is inherited from a "parent" MAC route. Doing so ensures that a single sequence number attribute carried in a combined MAC+IP route represents a sequence number for both a MAC only route as well as a MAC+IP route. A separate MAC only route with its own sequence number is no longer required to establish most recent reachability for a MAC in the overlay network. This enables a MAC route to assume a different IP route association on a move and enable the networking devices to identify the most recent MAC reachability information across the overlay network via the mobility attribute associated with the MAC+IP route advertisement.

Local MAC and LOCAL MAC+IP routes would typically be sourced from data plane learning and ARP learning respectively, and could be learned in the control plane in any order. Implementations could either replicate inherited sequence numbers in each MAC+IP entry or maintain a single attribute in the parent MAC by creating a forward reference local MAC object for cases where a local MAC+IP is learned before the local MAC.

In the techniques presented herein, local MAC+IP learning (e.g., via ARP or ND) results in determination/computation (or re-computation) of the sequence number of the parent MAC route, following which the modified MAC+IP route inherits the parent MAC route sequence number. In accordance with examples presented herein, the sequence number associated with the parent MAC route, and thus the sequence number that is assigned to the modified MAC+IP route, is computed according to two rules. First, the parent sequence number is determined to be higher than any existing remote MAC route for the local MAC route. Second, if the local IP route is also associated with a different remote MAC route, then the sequence number should be higher than the sequence number that is associated with those different remote MAC routes. As used herein, a "remote" MAC route is any existing use of the same MAC route that is present in the modified MAC+IP route, or any existing use of a MAC route that is associated with the IP route in the modified MAC+IP route. In the example of FIGS. 2 and 3, these rules are applied by the leaf node 220(2) and, more particularly, by the sequence number update module 222(2) of leaf nodes 220(2).

When either the virtual endpoint 260 (FIG. 2) or the virtual machine 370 (FIG. 3) moves to server 230(2), the sequence number update module 222(2) detects the virtual machine 260 or 370 at the server 230(2) and learns the modified MAC+IP route for the virtual machine (i.e., learns the IP route and MAC route of the virtual machine at server 230(2)). After learning the modified MAC+IP route for the virtual machine at server 230(2), the sequence number update module 222(2) uses the above two rules to compute a sequence number for the modified MAC+IP route, where the sequence number is inherited from a "parent" MAC route associated with the modified MAC+IP route. As noted above, the "parent" MAC route associated with the modified MAC+IP route is one of the Layer 2 route (i.e., MAC route) in the modified Layer 2/Layer 3 route (if the Layer 2 route in the modified MAC+IP route already exists in the network) or a Layer 2 route previously associated with the Layer 3 route (i.e., IP route) in the modified Layer 2/Layer 3 route (if the Layer 3 route in the modified MAC+IP route already exists in the network).

More specifically, to apply the first rule, after learning the modified MAC+IP route, the sequence number update module 222(2) performs a MAC route check to determine if the MAC route in the modified MAC+IP route already exists as a remote MAC route within the network 210 (i.e., determines whether or not the MAC route in the MAC+IP route is already in use as part of a different MAC+IP route). If the sequence number update module 222(2) determines that the MAC route in the modified MAC+IP route already exists as a remote MAC route, then the sequence number update module 222(2) sets the sequence number to be higher than the sequence number associated with the remote MAC route. In this case, the existing remote MAC route is the "parent" MAC route for the modified MAC+IP route. This is the situation shown in FIG. 3 where the MAC route (MAC-x), which forms part of MAC+IP route 375, already exists as a remote MAC route in MAC+IP route 365 (i.e., MAC-x is the parent MAC route from which the MAC+IP route 375 inherits a sequence number).

To apply the second rule, the update module 222(2) determines whether or not the IP route in the modified MAC+IP route is already associated with an existing remote MAC route within the network 210 (i.e., determines whether or not the IP route in the MAC+IP route is already in use as part of a different MAC+IP route). If the sequence number update module 222(2) determines that the IP route in the modified MAC+IP route is already associated with an existing remote MAC route, then the sequence number update module 222(2) sets the sequence number to be higher than the sequence number associated with the identified remote MAC route (i.e., the MAC route with which the IP route in the modified MAC+IP route is already associated). In this case, the existing remote MAC route associated with the IP route in modified MAC+IP route is the "parent" MAC route for the modified MAC+IP route. This is the situation shown in FIG. 2 where the IP route (IP-a), which forms part of MAC+IP route 275, is already associated with a remote MAC route in MAC+IP route 265 (i.e., MAC-a is the parent MAC route from which the MAC+IP route 275 inherits a sequence number).

It is to be appreciated that the above described order in which above two rules are applied is illustrative and that a sequence number update module in accordance with examples presented herein may make of these two rules in different orders, simultaneously, etc., to determine a sequence number for a modified MAC+IP route, where the sequence number is inherited from a parent MAC route associated with the modified MAC+IP route.

Figure 4:
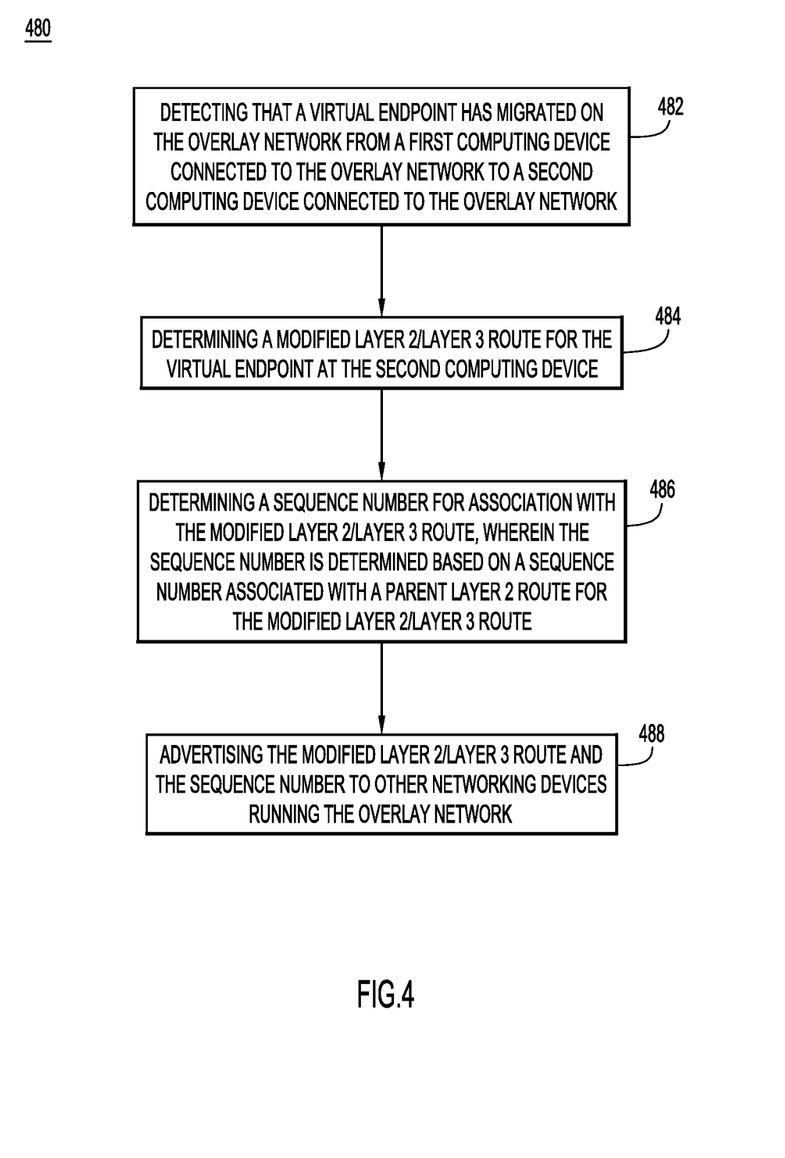
FIG. 4 is a flowchart illustrating a sequence number updating method, according to an example embodiment.

FIG. 4 is a flowchart of a method 480 in accordance with examples presented herein. Method 480 begins at 482 where a networking device running an overlay network, detects that a virtual endpoint has migrated on the overlay network from a first computing device connected to the overlay network to a second computing device connected to the overlay network. At 484, the networking device determines a modified Layer 2/Layer 3 route for the virtual endpoint at the second computing device. At 486, the networking device determines a sequence number for association with the modified Layer 2/Layer 3 route, wherein the sequence number is determined based on a sequence number associated with a parent Layer 2 route for the modified Layer 2/Layer 3 route. At 488, the networking device advertises the modified Layer 2/Layer 3 route and the sequence number to other networking devices running the overlay network.

Figure 5:
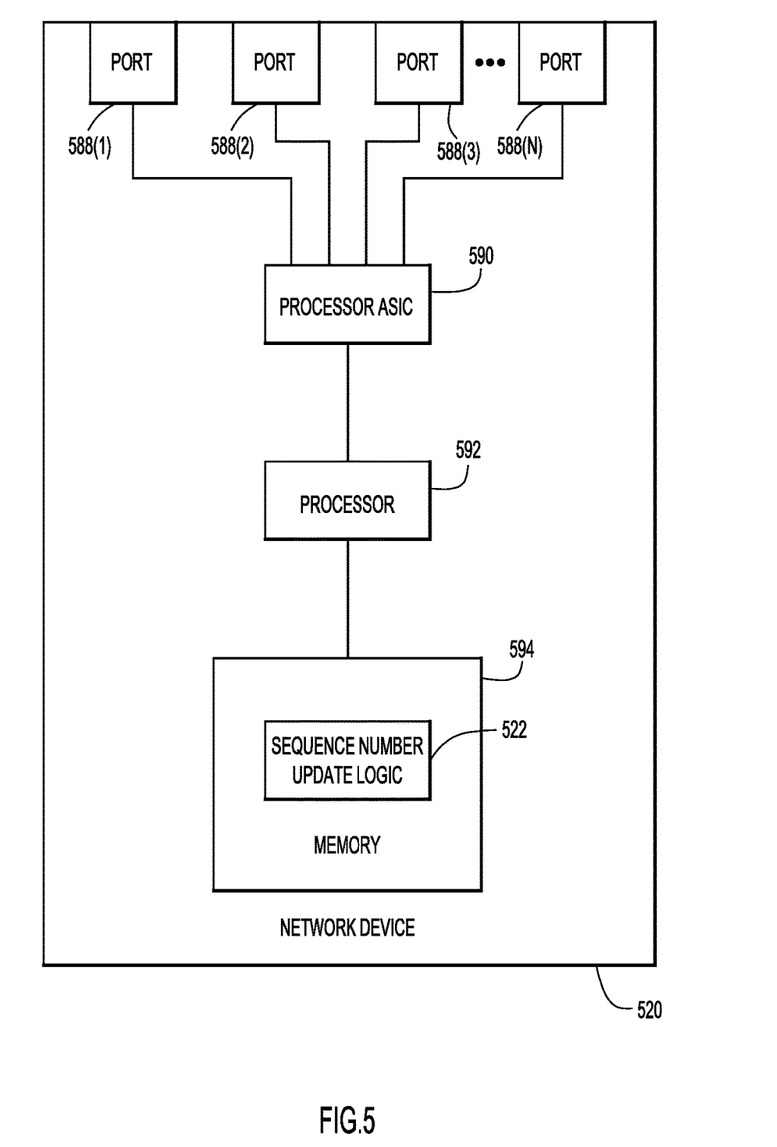
FIG. 5 is a block diagram of a networking device, according to an example embodiment.

FIG. 5 is a block diagram of a networking device 520 (e.g., leaf node/switch) that is configured to implement the techniques presented herein. The networking device 520 includes a network interface unit in the form of a plurality of network ports 588(1)-588(N) that enable communications over a network, a processor Application Specific Integrated Circuit (ASIC) 590 that performs network processing functions, one or more processors 592 (e.g., microprocessors or microcontrollers), and a memory 594. The memory 594 stores, among other elements, sequence number update logic 522. It is to be understood that, in certain examples, the network device 520 may be a virtual (software-based) appliance.

The memory 594 may include read only memory (ROM), random access memory (RAM), magnetic disk storage media devices, optical storage media devices, flash memory devices, electrical, optical, or other physical/tangible memory storage devices. Thus, in general, the memory 594 may comprise one or more tangible (non-transitory) computer readable storage media (e.g., a memory device) encoded with software comprising computer executable instructions and when the software is executed (by the one or more processors 592) it is operable to perform the operations described herein with reference to a leaf node. In particular, as noted, the memory 594 includes sequence number update logic 522 that, when executed, enables the networking device 520 to perform the operations described above with reference to a sequence number update module, namely to detect a modified MAC+IP route, determine a sequence number for association with the modified MAC+IP route, where the sequence number is inherited from a parent MAC route associated with the modified MAC+IP route, and advertise the modified MAC+IP route and associated sequence number in the network.

Host mobility is a key feature that enables virtual workloads using an EVPN-IRB based overlay network. Existing EVPN IRB mobility procedures implicitly assume a fixed mapping between a virtual endpoint IP route and a MAC route that does not change upon a virtual endpoint move/migration event. While this assumption holds for baseline EVPN IRB scenarios, additional use cases have been identified where the MAC-IP mapping could change following a virtual endpoint move/migration event (i.e., the 1:1 mapping assumption is broken). As such, presented herein are EVPN mobility techniques that are able to support a wide set of use cases without making assumptions with respect to a fixed MAC-IP binding and, accordingly, allowing MAC-IP bindings to change across MAC and/or IP moves. The techniques presented herein allow multiple IP routes to be associated with a single MAC route, allow an IP route to move to a different MAC route (i.e., to be associated with a different MAC route), and/or allow MAC routes to move to a different IP route (i.e., to be associated with a different IP route). In particular, the techniques presented herein support a wide range of EVPN IRB use cases by employing sequence number assignment procedures were the sequence number is determined based on a parent MAC route associated with a modified MAC+IP route, without any assumptions with respect to MAC-IP correlation.

In one example, a method implemented at a networking device running an overlay network is provided. The method comprises: detecting that a virtual endpoint has migrated on the overlay network from a first computing device connected to the overlay network to a second computing device connected to the overlay network; determining a modified Layer 2/Layer 3 route for the virtual endpoint at the second computing device; determining a sequence number for association with the modified Layer 2/Layer 3 route, wherein the sequence number is determined based on a sequence number associated with a parent Layer 2 route for the modified Layer 2/Layer 3 route; and advertising the modified Layer 2/Layer 3 route and the sequence number to other networking devices running the overlay network.

In one example, an apparatus is provided. The apparatus comprises: a plurality of network ports to enable network communications including over an overlay network; a memory; and a processor coupled to the plurality of network ports and the memory, the processor configured to: detect that a virtual endpoint has migrated on the overlay network from a first computing device connected to the overlay network to a second computing device connected to the overlay network; determine a modified Layer 2/Layer 3 route for the virtual endpoint at the second computing device; determine a sequence number for association with the modified Layer 2/Layer 3 route, wherein the sequence number is determined based on a sequence number associated with a parent Layer 2 route for the modified Layer 2/Layer 3 route; and advertise the modified Layer 2/Layer 3 route and the sequence number to other networking devices running the overlay network.

In one example, one or more non-transitory computer readable storage media of a networking device running an overlay network are provided. The computer readable storage media being encoded with software comprising computer executable instructions, and when the software is executed, operable to: detect that a virtual endpoint has migrated on the overlay network from a first computing device connected to the overlay network to a second computing device connected to the overlay network; determine a modified Layer 2/Layer 3 route for the virtual endpoint at the second computing device; determine a sequence number for association with the modified Layer 2/Layer 3 route, wherein the sequence number is determined based on a sequence number associated with a parent Layer 2 route for the modified Layer 2/Layer 3 route; and advertise the modified Layer 2/Layer 3 route and the sequence number to other networking devices running the overlay network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a networking device running an overlay network:
      detecting that a virtual endpoint has migrated on the overlay network from a first computing device connected to the overlay network to a second computing device connected to the overlay network;
      determining a modified Layer 2/Layer 3 route for the virtual endpoint at the second computing device, wherein in the modified Layer 2/Layer 3 route for the virtual endpoint at the second computing device, a Layer 2 route of the virtual endpoint at the second computing device is the same as a Layer 2 route of the virtual endpoint at the first computing device;
      determining a sequence number for a parent Layer 2 route for the modified Layer 2/Layer 3 route, wherein the parent Layer 2 route is the Layer 2 route in the modified Layer 2/Layer 3 route;
      determining a sequence number for association with the modified Layer 2/Layer 3 route based on the sequence number for the parent Layer 2 route; and
      advertising the modified Layer 2/Layer 3 route and the sequence number for association with the modified Layer 2/Layer 3 route to other networking devices running the overlay network.

2. The method of claim 1, wherein determining the sequence number for the parent Layer 2 route comprises:
   determining whether the Layer 2 route in the modified Layer 2/Layer 3 route already exists as a remote Layer 2 route within the overlay network; and
   if the Layer 2 route in the modified Layer 2/Layer 3 route already exists as a remote Layer 2 route within the overlay network, setting the sequence number for the parent Layer 2 route to be higher than a sequence number associated with the remote Layer 2 route.

3. The method of claim 1, wherein determining the sequence number for the parent Layer 2 route comprises:
   determining whether a Layer 3 route in the modified Layer 2/Layer 3 route is already associated with an existing remote Layer 2 route within the overlay network; and
   if the Layer 3 route in the modified Layer 2/Layer 3 route is already associated with an existing remote Layer 2 route, setting the sequence number for the parent Layer 2 route to be higher than a sequence number associated with the existing remote Layer 2 route within the overlay network.

4. The method of claim 1, wherein the overlay network employs an Ethernet Virtual Private Network (EVPN) route-family as a control plane for use in exchanging Layer 2/Layer 3 routes associated with virtual endpoints.

5. The method of claim 1, wherein the modified Layer 2/Layer 3 route for the virtual endpoint comprises a Media Access Control (MAC) route for the virtual endpoint at the second computing device.

6. The method of claim 1, wherein the modified Layer 2/Layer 3 route for the virtual endpoint comprises an Internet Protocol (IP) route for the virtual endpoint at the second computing device.

7. The method of claim 1, wherein determining the sequence number for association with the modified Layer 2/Layer 3 route includes incrementing the sequence number for the parent Layer 2 route by one.

8. An apparatus comprising:
   a plurality of network ports to enable network communications including over an overlay network;
   a memory; and
   a processor coupled to the plurality of network ports and the memory, the processor configured to:
      detect that a virtual endpoint has migrated on the overlay network from a first computing device connected to the overlay network to a second computing device connected to the overlay network;
      determine a modified Layer 2/Layer 3 route for the virtual endpoint at the second computing device, wherein in the modified Layer 2/Layer 3 route for the virtual endpoint at the second computing device, a Layer 2 route of the virtual endpoint at the second computing device is the same as a Layer 2 route of the virtual endpoint at the first computing device;
      determine a sequence number for a parent Layer 2 route for the modified Layer 2/Layer 3 route, wherein the parent Layer 2 route is the Layer 2 route in the modified Layer 2/Layer 3 route;
      determine a sequence number for association with the modified Layer 2/Layer 3 route based on the sequence number for the parent Layer 2 route; and
      advertise the modified Layer 2/Layer 3 route and the sequence number for association with the modified Layer 2/Layer 3 route to other networking devices running the overlay network.

9. The apparatus of claim 8, wherein to determine the sequence number for the parent Layer 2 route, the processor is configured to:
   determine whether the Layer 2 route in the modified Layer 2/Layer 3 route already exists as a remote Layer 2 route within the overlay network; and
   if the Layer 2 route in the modified Layer 2/Layer 3 route already exists as a remote Layer 2 route within the overlay network, set the sequence number for the parent Layer 2 route to be higher than a sequence number associated with the remote Layer 2 route.

10. The apparatus of claim 8, wherein to determine the sequence number for the parent Layer 2 route, the processor is configured to:
  determine whether a Layer 3 route in the modified Layer 2/Layer 3 route is already associated with an existing remote Layer 2 route within the overlay network; and
  if the Layer 3 route in the modified Layer 2/Layer 3 route is already associated with an existing remote Layer 2 route, set the sequence number for the parent Layer 2 route to be higher than a sequence number associated with the existing remote Layer 2 route within the overlay network.

11. The apparatus of claim 8, wherein the overlay network employs an Ethernet Virtual Private Network (EVPN) route-family as a control plane for use in exchanging Layer 2/Layer 3 routes associated with virtual endpoints.

12. The apparatus of claim 8, wherein the modified Layer 2/Layer 3 route for the virtual endpoint comprises a Media Access Control (MAC) route for the virtual endpoint at the second computing device.

13. The apparatus of claim 8, wherein the modified Layer 2/Layer 3 route for the virtual endpoint comprises an Internet Protocol (IP) route for the virtual endpoint at the second computing device.

14. The apparatus of claim 8, wherein to determine the sequence number for association with the modified Layer 2/Layer 3 route, the processor is configured to increment the sequence number for the parent Layer 2 route by one.

15. One or more non-transitory computer readable storage media of a networking device running an overlay network, the computer readable storage media being encoded with software comprising computer executable instructions, and when the software is executed, operable to:
  detect that a virtual endpoint has migrated on the overlay network from a first computing device connected to the overlay network to a second computing device connected to the overlay network;
  determine a modified Layer 2/Layer 3 route for the virtual endpoint at the second computing device, wherein in the modified Layer 2/Layer 3 route for the virtual endpoint at the second computing device, a Layer 2 route of the virtual endpoint at the second computing device is the same as a Layer 2 route of the virtual endpoint at the first computing device;
  determine a sequence number for a parent Layer 2 route for the modified Layer 2/Layer 3 route, wherein the parent Layer 2 route is the Layer 2 route in the modified Layer 2/Layer 3 route;
  determine a sequence number for association with the modified Layer 2/Layer 3 route based on the sequence number for the parent Layer 2 route; and
  advertise the modified Layer 2/Layer 3 route and the sequence number for association with the modified Layer 2/Layer 3 route to other networking devices running the overlay network.

16. The non-transitory computer readable storage media of claim 15, wherein the instructions operable to determine the sequence number for the parent Layer 2 route comprise instructions operable to:
  determine whether the Layer 2 route in the modified Layer 2/Layer 3 route already exists as a remote Layer 2 route within the overlay network; and
  if the Layer 2 route in the modified Layer 2/Layer 3 route already exists as a remote Layer 2 route within the overlay network, set the sequence number for the parent Layer 2 route to be higher than a sequence number associated with the remote Layer 2 route.

17. The non-transitory computer readable storage media of claim 15, wherein the instructions operable to determine the sequence number for the parent Layer 2 route comprise instructions operable to:
  determine whether a Layer 3 route in the modified Layer 2/Layer 3 route is already associated with an existing remote Layer 2 route within the overlay network; and
  if the Layer 3 route in the modified Layer 2/Layer 3 route is already associated with an existing remote Layer 2 route, set the sequence number for the parent Layer 2 route to be higher than a sequence number associated with the existing remote Layer 2 route within the overlay network.

18. The non-transitory computer readable storage media of claim 15, wherein the overlay network employs an Ethernet Virtual Private Network (EVPN) route-family as a control plane for use in exchanging Layer 2/Layer 3 routes associated with virtual endpoints.

19. The non-transitory computer readable storage media of claim 15, wherein the modified Layer 2/Layer 3 route for the virtual endpoint comprises a Media Access Control (MAC) route and an Internet Protocol (IP) route for the virtual endpoint at the second computing device.

20. The non-transitory computer readable storage media of claim 15, wherein the instructions operable to determine the sequence number for association with the modified Layer 2/Layer 3 route comprise instructions operable to increment the sequence number for the parent Layer 2 route by one.

* * * * *